US012633743B2

(12) United States Patent
Wolff

(10) Patent No.: US 12,633,743 B2
(45) Date of Patent: May 19, 2026

(54) ELECTRICAL GRID HAVING A PROTECTION

(71) Applicant: Murrelektronik GmbH, Oppenweiler (DE)

(72) Inventor: Ingo Wolff, Oppenweiler (DE)

(73) Assignee: MURRELEKTRONIK GMBH (DE)

( * ) Notice: Subject to any disclaimer, the term of this patent is extended or adjusted under 35 U.S.C. 154(b) by 0 days.

(21) Appl. No.: 18/773,718

(22) Filed: Jul. 16, 2024

(65) Prior Publication Data

US 2025/0030238 A1     Jan. 23, 2025

(51) Int. Cl.
*H02J 1/14*     (2026.01)
*H02J 1/00*     (2026.01)
*H02J 13/36*     (2026.01)
*H02J 101/40*     (2026.01)

(52) U.S. Cl.
CPC ................ *H02J 1/14* (2013.01); *H02J 1/001* (2020.01); *H02J 13/36* (2026.01); *H02J 2101/40* (2026.01)

(58) Field of Classification Search
CPC .......... H02J 1/14; H02J 1/001; H02J 13/0004; H02J 2300/40; H02J 3/001; H02J 3/04; H02H 1/0092; H02H 7/263; H02H 7/268; H02H 7/28
See application file for complete search history.

(56) References Cited

U.S. PATENT DOCUMENTS

| | | | |
|---|---|---|---|
| 7,518,266 B2 | 4/2009 | Eckroad | |
| 9,178,350 B2 | 11/2015 | Yan et al. | |
| 2003/0020333 A1* | 1/2003 | Ying ................. | H02J 13/00004 307/38 |
| 2018/0316188 A1* | 11/2018 | Ishchenko ............. | H02J 3/0012 |
| 2019/0079129 A1 | 3/2019 | Valdes | |
| 2023/0061694 A1 | 3/2023 | Kazmi et al. | |
| 2023/0069168 A1 | 3/2023 | Manson et al. | |

FOREIGN PATENT DOCUMENTS

| | | |
|---|---|---|
| DE | 102011078551 A1 | 1/2013 |
| DE | 102018122248 A1 | 3/2019 |

* cited by examiner

*Primary Examiner* — Rexford N Barnie
*Assistant Examiner* — Thai H Tran
(74) *Attorney, Agent, or Firm* — Dilworth IP, LLC

(57) ABSTRACT

An electrical grid for a decentralized energy system, including at least one current distribution system having at least two feed-in points, at least one current detection device, and at least one current regulation device, wherein the current detection device is configured and set up to detect respective currents flowing in different directions into the current distribution system at the feed-in points, and wherein the current regulation device is configured and set up to regulate currents in the current distribution system if at least one of the currents detected by the current detection device exceeds a predetermined threshold value.

15 Claims, 3 Drawing Sheets

ELECTRICAL GRID HAVING A PROTECTION

FIELD OF THE DISCLOSURE

Embodiments of the present disclosure relate to an electrical grid for a decentralized energy system having a protection.

BACKGROUND

Traditional supply grids typically have different levels, for example an extra-high voltage level, a high and/or medium voltage level and a low voltage level. The direction of the energy flow between the levels is often unidirectional from high to low.

The energy flow typically starts at the power plants and continues through the individual levels to the consumers. The grids therefore represent a tree structure. The tree structure can also be continued at the end consumers, for example in the form of so-called microgrids.

In classic industrial plants, but also in households, there is often a central feed-in from the higher-level grid and a plurality of loads and possibly also other generators, e.g. photovoltaic systems, which are all interconnected. The energy fed in is distributed to the loads.

Protection is typically provided at the feed-in, the level of protection depending on the dimensions of the system and the energy distribution. The outgoing lines are in turn protected according to their current-carrying capacity.

When dimensioning the entire system, requirements are also placed on selectivity. Complete selectivity ensures that in the event of a fault in the electric circuit with protection devices connected in series, only the protection device immediately upstream of the fault location will trip. This increases the security of supply.

If, for example, two protection devices are connected in series, complete selectivity is achieved if the preceding protection device is greater than the following one by a factor of at least 1.6.

This type of protection is used for domestic connections, for example. In the distribution cabin where the house connection cables arrive, they are protected with 100 amperes (A) if the house is protected with 63 A. This ensures that the protection device in the house connection trips first, before the protection device in the distribution cabin trips.

However, it is difficult to ensure complete selectivity, especially in systems having many discharge and feed lines, as individual network areas or protection devices would have to be dimensioned very large therefor. As a result, the cables used must also be dimensioned according to the protection device. Designing the outgoing lines with complete selectivity would result in the system being oversized during normal operation.

For this reason, many grids are often designed to be only partially selective. This means that not the entire grid is designed to be fully selective, but that selectivity is only achieved for some of the possible faults.

For example, in a house connection protected with 63 A, several strings can branch from a main fuse. With three strings, each protected with 10 A, there is complete selectivity (assuming that all protection devices are fuses of the same operating class). However, if there are four strings, each protected with 10 A, there is no longer complete selectivity, as the sum of the individual currents which can run through the individual strings multiplied by a factor of 1.6 results in a value greater than 63 A.

With such a system, it is very likely, but not certain, that only the downstream protection device closest to the source of the fault will trip in the event of a fault. The design of this type of partial selectivity is based on the statistical assumption that the sum of the actual currents in the individual strings is so low that a fault in one string will not cause the upstream protection device to trip.

Such a partially selective design is particularly useful in grids having a large number of outgoing lines, as a fully selective design would result in extreme oversizing of the lines in normal operation.

However, this may lead to an overloading of individual grid areas. Such a case may in particular occur if there is additional feed-in into the grid at several points (for example via photovoltaic systems) and the quantities of energy supplied and discharged are subject to strong fluctuations.

If, for example, there is a grid with a plurality of loads supplied by a higher-level grid via a first protected feed-in point and supplied by a photovoltaic system via a second protected feed-in point, overloading can occur in conventional systems in individual grid areas which are supplied by both feed-in points. To reliably prevent this, the grid area must be dimensioned such that it is not overloaded by the sum of the maximum currents which can flow via the first feed-in point and the second feed-in point.

Particularly in the case of companies which are able to be temporarily completely self-sufficient, it may be the case that, in extreme cases, individual grid areas have be designed for a current carrying capacity which corresponds to twice the current value protected at the main feed-in point in order to reliably avoid overloading.

In this context, the rapid development of renewable energies and the decentralization of energy producers and consumers create new challenges in the field of grid protection. Regenerative generators and storage technologies are added at the various levels (high, medium and low voltage levels). As a result, the energy transport of a historically unidirectionally designed grid is now bidirectional.

To not overload the grids and to keep the energy consumed in balance with the energy generated, complex control systems are often used and/or rules are established. For example, to prevent local electric generators from overloading the grids, small generators are only allowed to supply certain amounts of electricity. Larger generators, such as wind turbines, or generators at other levels are controlled via complex energy management systems. Generators are switched on or off as required to meet the demand and avoid overloading of the lines.

However, in large areas of the low-voltage grids and/or at end consumers, adequate regulation of the individual generators and consumers is often inappropriate due to the complexity and expense involved. The monitoring of the current flow of individual strings of the grids is often only carried out at individual points, in particular at the central feed-in points.

This leads to problems, particularly in the case of established microgrids, which are increasingly used in industry, as there are often a large number of different grid participants, such as controllable and non-controllable unidirectional and bidirectional generators and consumers.

Particularly when such systems are expanded or when there is an increased energy demand, there is therefore a risk of overloads occurring in parts of the microgrid and, as a result, of damage or even fires.

The object of the present disclosure is therefore to provide a way of distributing energy in an energy system which ensures that the energy system or energy distribution system is not overloaded.

SUMMARY

According to the present disclosure, the object is achieved by an electrical grid for a decentralized energy system, for example for a microgrid. The electrical grid comprises at least one current distribution system (for example formed by busbars or electric cables) having at least two feed-in points. The electrical grid also comprises at least one current detection device and at least one current regulation device. The current detection device is configured and set up to detect respective currents flowing in different directions into the current distribution system at the feed-in points. The current regulation device is configured and set up to regulate currents in the current distribution system if at least one of the currents detected by the current detection device exceeds a predetermined threshold value.

The term "regulate" includes various options for changing the current flow, in particular by switching on, switching off and/or throttling consumers, generators, storage units and/or parts of the electrical grid.

The fact that currents flowing in different directions in the electrical grid can be detected improves control over individual line sections of the energy system. It is thus possible to detect impending overloads quickly and to take countermeasures. Due to the improved control, any otherwise necessary oversizing of the energy system can be reduced to a minimum.

In one embodiment of the present disclosure, the current detection device is configured and set up to detect current flows electronically and/or on the basis of a heating of a component of the current distribution system. For example, current flows can be detected in a technically simple manner and with high precision based on the heating of a safety wire and/or a bimetallic strip and/or current measuring resistors (shunts) and/or based on a current-induced magnetic field.

Measuring the temperature at different points in the current distribution system can also be used to determine the current flows in different directions.

The current detection device and the current regulation device may also be a common device, for example a protection device. However, they may also be different devices.

It is conceivable that the current regulation device is configured and set up to regulate currents in the current distribution system by regulating a power of a feed-in system connected to a feed-in point. Alternatively, the feed-in system can be switched off and/or the feed-in system can be disconnected from the feed-in point. This can be done, for example, by disconnecting or triggering a mechanical or electromechanical switch, a protection device and/or a fuse.

An overload and/or impending overload can thus be prevented quickly and easily without having to interrupt connections within the current distribution system. Such an interruption of the connection may, for example, lead to an undesired redistribution of current flows within the current distribution system, which in turn can lead to overloads at other points and ultimately to a kind of chain reaction.

Furthermore, it may be provided that the current regulation device is configured and set up to regulate currents in the current distribution system by interrupting the current distribution system in at least one direction and/or by regulating, switching off or disconnecting loads connected to the current distribution system from the current distribution system. This allows current flows in the current distribution system to be regulated quickly and effectively and/or redistributed in a purposeful manner.

One example of loads the consumption of which can be regulated for a limited time is cold stores. The cooling function can be maintained even if the cooling is temporarily throttled and/or switched off.

A further example are energy storage systems. These can act as a load when charging and as a feed-in system when discharging. Both charging and discharging can be controlled or regulated for the purpose of regulating the current in the current distribution system.

It is also conceivable that the current regulation device is configured and set up to regulate currents in the current distribution system only by switching off, regulating and/or disconnecting loads if switching off, regulating and/or disconnecting one or more suppliers from the current distribution system is not sufficient to regulate the currents in the current distribution system adequately.

In other words, the switching off, regulation and/or disconnection of loads can take place after the switching off, regulation and/or disconnection of one or more suppliers.

In a preferred variant embodiment, the current distribution system is configured and set up to be operated with direct current. The electrical grid can in particular be part of a DC microgrid. DC grids have the advantage that the energy from many individual generators (e.g. photovoltaic systems) can be fed directly into the current distribution system without an intermediate inverter. On the other hand, many loads which work with direct current can also be operated directly, i.e. without an intermediate rectifier, with electricity from the DC microgrid. This avoids conversion losses.

It is also conceivable that the current distribution system or DC microgrid can be operated as a stand-alone grid. This makes it independent of higher-level supply levels, which increases the security of supply.

In a further embodiment, the electrical grid has at least two current detection and/or current regulation devices, each of which has a communication unit via which the current detection and/or current regulation devices can communicate with each other.

This allows information about current flows in different areas of the electrical grid to be detected and exchanged. In particular, this allows conclusions to be drawn about a resulting current flow in an area of the current distribution system between the communicating current detection and/or current regulation devices. This ensures that there is no overload, even with a lean design of the current distribution system. A fully selective design and/or oversizing of the current distribution system is not necessary.

In embodiments with communicating current regulation devices, the current can also be regulated by switching off, regulating and/or disconnecting one or more suppliers and/or loads.

Communication can take place locally, for example between two neighboring feed-in points, and/or globally via all current regulation devices having a communication unit distributed in the electrical grid.

It is also conceivable that the electrical grid comprises artificial intelligence (AI). In particular, in the case of communicating or networked current regulation devices, current regulation can be carried out by means of the (AI).

The AI can be trained by machine learning.

For example, the AI may be configured and set up to evaluate the extent to which switching off, regulating and/or disconnecting one or more suppliers and/or loads affects the current flow in the current distribution system or a sub-area thereof. This can effectively prevent overloads and improve the security of supply.

The current distribution system may also comprise a plurality of segments, which are separably connected to each other and/or separably connected to a feed-in system by means of current regulation devices. In particular, the segments may be parts of the current distribution system which distribute power to one or more loads.

The advantage of the segmented design is that the individual segments can be dimensioned differently, in particular according to demand. This means that the current-carrying capacity of the current distribution system can be lower at some points, where typically only lower loads occur, than at other points, at which higher loads are to be expected.

For example, the current regulation device may also be configured and set up to separate segments having a lower current carrying capacity from the current distribution system before other segments having a higher current carrying capacity, or to preferentially regulate the current flow in these segments. In this way, segments having weaker dimensions can be effectively protected against overload and/or damage.

Two segments can be connected, for example, at a feed-in point via which both segments are supplied with current. This makes it easy to monitor and/or regulate the flow of current into the two segments.

In general, each of the segments is connected directly or indirectly via other segments to at least one feed-in system for the energy supply or feed-in.

In particular, it may also be provided that each segment has one or more electrical loads and/or that at least one feed-in point is assigned to each segment. It may also be provided that a segment is fed from at least one side (preferably from two sides), each feed into the segment being monitored by means of a current detection device.

In a preferred embodiment, the segments of the current distribution system are configured or arranged such that each segment is fed from a maximum of two sides. This simplifies current regulation.

In particular, it may be provided that each of the segments is directly connected to a maximum of two feed-in points. Nevertheless, a single segment can also be fed by more than two feed-in systems, for example if several feed-in systems are connected to the segment via a common feed-in point.

In a further embodiment of the electrical grid, a plurality of feed-in points is provided in the current distribution system, each of which feeds in protected by an associated current regulation device. Protection is therefore provided at each individual feed-in point. This increases the safety of the electrical grid.

In a further design, a plurality of electrical loads is provided in the current distribution system. However, only some of these are connected to the current distribution system via current regulation devices. In particular, it may be provided that only large loads or continuous loads are connected individually to the current distribution system via a current regulation device. A resource-intensive, separately secured connection for each individual load can therefore be dispensed with. Nevertheless, this measure can further reduce the risk of overload and/or blackouts in the electrical grid.

Furthermore, it may be provided that two or more feed-in systems are connected to the at least one feed-in point of the electrical grid. The feed-in systems may be connected to the feed-in point via a single current regulation device. This saves resources compared to systems in which each individual feed-in system is individually protected.

In a further preferred embodiment, one or more segments of the current distribution system are dimensioned such that a sum of breaking currents of all current regulation devices directly connected to the corresponding segment does not overload the segment. In this way, individual segments can be protected against overload.

In a further variant embodiment, it is provided that at least one segment has two opposite segment ends, each of which is connected to a feed-in point, the segment being fed exclusively via the two segment ends. Current regulation devices (e.g. protection devices) are located at both segment ends.

In this variant embodiment, it may be provided that both the current regulation devices and the relevant segment itself are each designed for the maximum current carrying capacity of the current distribution system. For example, if the maximum current carrying capacity of the current distribution system is 100 A, the current regulation devices are also designed for this value (e.g. protection devices with a breaking current of 100 A).

Since feed-in takes place exclusively via the segment ends, the current carrying capacity of the segment cannot be exceeded, although the segment is not designed for the sum of the breaking currents of all directly connected current regulation devices, as is conventionally the case.

In a further embodiment of the present disclosure, it may be provided that all feed-in points in the current distribution system are arranged such that current can respectively flow from the feed-in points in different directions into the current distribution system. This arrangement splits the current flow coming from the feed-in point and reduces the load on the individual lines of the current distribution system. This can be achieved, for example, by arranging each of the feed-in points of the electrical grid between two segments. In this way, the electricity fed in via each feed-in point can be distributed to the respectively adjacent segments.

It is also conceivable that the current distribution system is designed as a ring structure. In ring structures, the current is typically distributed almost equally in both directions at feed-in points. This reduces the load on individual line sections or, in the case of a segmented structure, the current in the individual segments. This results in optimum utilization of the infrastructure, particularly in the case of several feeds along the ring structure. Oversizing of the current distribution system can be avoided and material can be saved.

BRIEF DESCRIPTION OF THE DRAWINGS

Further features and advantages of the present disclosure will become apparent from the description below and from the accompanying drawings, to which reference is made and in which.

DETAILED DESCRIPTION

Figure 1:
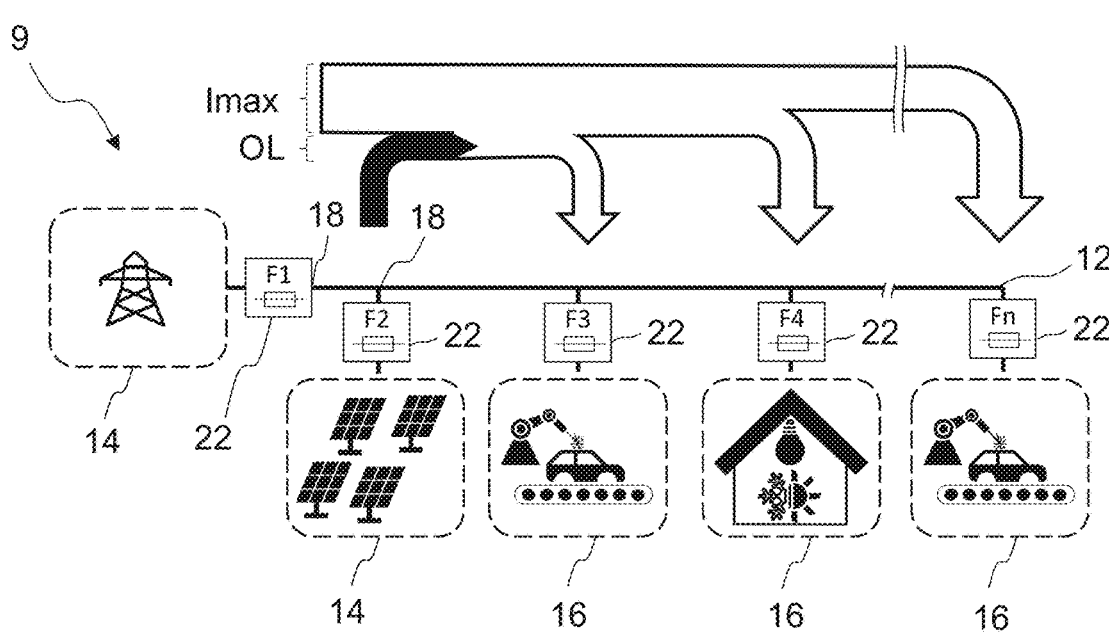
FIG. 1 shows a schematic representation of an electrical grid known from the prior art.

FIG. 1 shows a schematic representation of a conventional electrical grid 9 known from the prior art.

The conventional electrical grid 9 has a current distribution system 12, which comprises power cables and/or busbars. The current distribution system 12 electrically interconnects feed-in systems 14 connected to the conventional electrical grid 9, in the present case a photovoltaic system and a higher-level grid, and loads 16, e.g. building technology or industrial systems.

Points at which electrical energy from one of the feed-in systems 14 enters the conventional electrical grid 9 are referred to as feed-in points 18.

Furthermore, the conventional electrical grid 9 has a plurality of current regulation devices 22 (in the example protection devices F1, F2, F3, F4, -Fn).

In FIG. 1, the nominal or rated current of the lines Imax is also symbolized, which corresponds to the maximum current carrying capacity of the current distribution system 12.

In the conventional electrical grid 9 shown, the nominal or rated current of the protection device F1, via which the higher-level grid is connected, corresponds to the nominal or rated current of the lines Imax.

With this design of the conventional electrical grid 9, an overload OL can occur if there is also a feed-in via the photovoltaic system, which is connected to the conventional electrical grid 9 via the protection device F2.

To prevent such an overload, current distribution systems 12 are typically designed such that the current carrying capacity thereof corresponds to the sum of the nominal or rated currents of all those protection devices F1, F2 via which feed-in systems 14 are connected.

Figure 2:
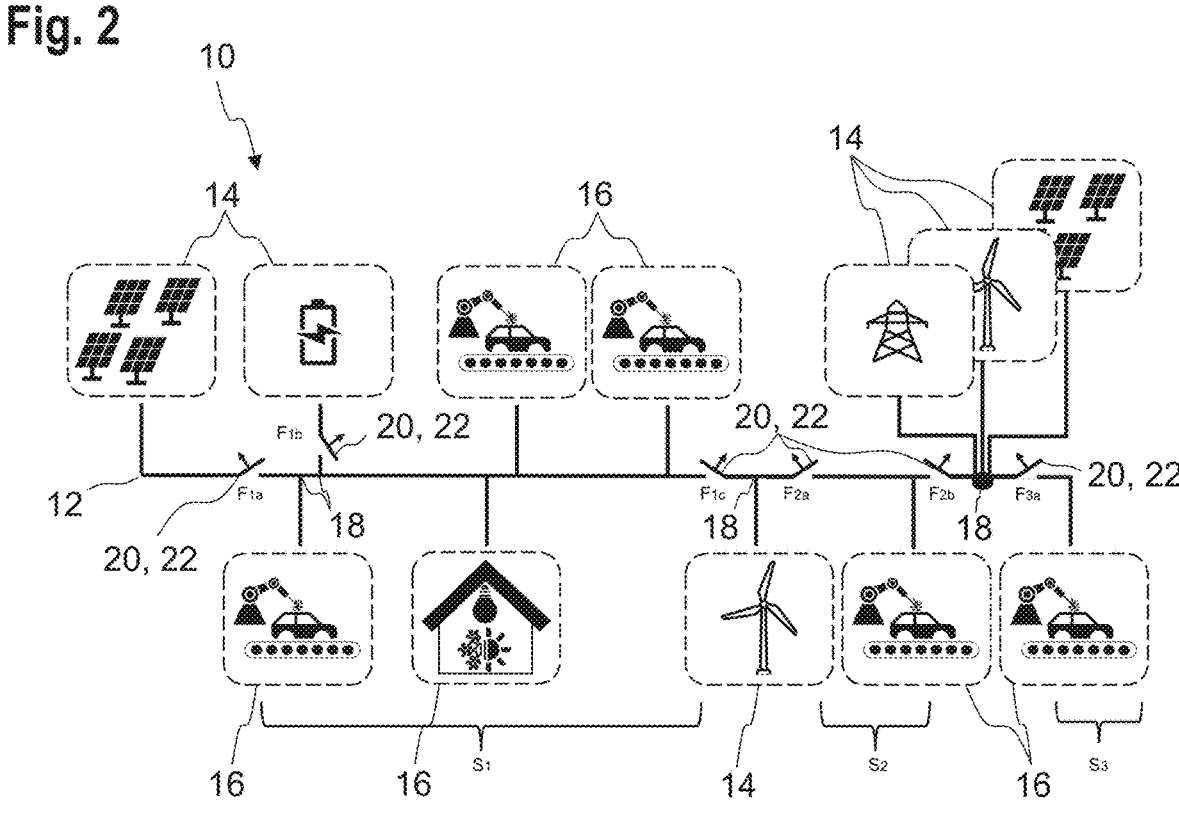
FIG. 2 shows a schematic representation of a first embodiment of an electrical grid according to the present disclosure with protections at the feed-in points.

FIG. 2 shows a first embodiment of an electrical grid 10 according to the present disclosure for a microgrid.

The electrical grid 10 comprises a current distribution system 12, which in particular comprises power cables and/or busbars, which electrically interconnect feed-in systems 14 connected to the electrical grid 10, e.g. photovoltaic systems, wind turbines or storage systems, and loads 16, e.g. building technology or industrial plants.

The current distribution system 12 is configured and set up to be operated with direct current. It is therefore a direct current grid. This allows conversion losses to be avoided when feeding in energy, for example from photovoltaic systems and/or battery storage systems, and when energy is drawn from direct current loads.

In the example embodiment, the current distribution system 12 is segmented. It therefore comprises a plurality of segments S1, S2, S3.

Points at which electrical energy from one of the feed-in systems 14 enters the electrical grid 10 are here also referred to as feed-in points 18.

In the example embodiment, the current distribution system 12 is segmented by the feed-in points 18.

A segment S1, S2, S3 is an area of the current distribution system 12 which is preferably separably connected to other areas of the current distribution system 12, in particular other segments S1, S2, S3, via a feed-in point.

As shown in FIG. 2, two or more feed-in systems 14 can also be connected to one feed-in point 18.

In addition, the electrical grid 10 comprises a plurality of current detection devices 20 and current regulation devices 22.

In the first example embodiment, a current detection device 20 and a current regulation device 22 each form a common component, namely a protection device F1a, F1b, F1c, F2a, F2b, F3a.

The protection devices F1a, F1b, F1c, F2a, F2b, F3a can, for example, be fuses, electronic fuses or (electromechanical) circuit breakers. Depending on the type of protection device, the current flows are detected in different ways, in particular based on a heating of a safety wire and/or a bimetallic strip and/or based on a current-induced magnetic field. Of course, other types of protection devices are also conceivable.

As shown in FIG. 2, the segment S1 and the segment S2 are separably connected to each other via the protection devices F1c and F2a.

The segment S2 and the segment S3 are separably connected to each other via the protection devices F2b and F3a.

The connection of two segments S1, S2, S3 is respectively realized at a feed-in point 18, via which both segments S1, S2, S3 are supplied with current. In this respect, a feed-in point 18 can be assigned to two segments S1, S2, S3, as shown, for example, for the wind power plant in FIG. 2, which is assigned to the first segment S1 and the second segment S2.

Each of the segments S1, S2, S3 has at least one feed-in point 18 assigned thereto, to which it is directly connected in a separable manner via one of the protection devices F1a, F1b, F1c, F2a, F2b, F3a.

Of course, a plurality of feed-in points 18 can also be assigned to one segment S1, S2, S3. This is shown, for example, in FIG. 2 by means of segment S1, which has three feed-in points 18 assigned thereto, to which three protection devices F1a, F1b, F1c are assigned.

The protection devices F1c and F2a can be used to detect currents flowing in different directions into the current distribution system 12 at the feed-in point 18 located between the segments S1 and S2.

The current flowing into the first segment S1 can be detected via the protection device F1c, and the current flowing into the second segment S2 can be detected via the protection device F2a.

The protection devices F1c and F2a are configured and set up to regulate currents in the current distribution system 12 if at least one of the currents detected thereby exceeds a predetermined threshold value.

In the simplest case, regulation can take place by triggering the relevant protection device F1c, F2a, at which the threshold value is exceeded, i.e. in case of an opening of the corresponding protection device F1c, F2a.

The same applies to the protection devices F2b and F3a. These protection devices can also detect currents flowing in different directions into the current distribution system 12 at the feed-in point 18 between the segments S2 and S3 and regulate them if necessary.

In principle, the electrical grid 10 can thus be protected against overload.

It should be noted here that the maximum current carrying capacity of the individual segments S1, S2, S3 must not be exceeded.

In the example embodiment, the segment S2 and the protection devices F2a and F2b are each designed for the maximum current-carrying capacity of the current distribution system 12. If the maximum current-carrying capacity is 100 A, for example, the protection devices F2a and F2b are each designed for 100 A. As the segment S2 is only fed via the two protection devices F2a and F2b, which are arranged on opposite sides, it is ensured that the segment S2 cannot be overloaded.

The situation is different for the segment S1. As shown in FIG. 2, it is fed via three feed-in points 18. To reliably avoid an overload of the segment S1, the protection devices F1a, F1b and F1c directly adjacent to S1 are dimensioned such that the sum of their breaking currents corresponds to the maximum current-carrying capacity of the segment S1. It is thus ensured that no overload can occur. With a maximum current-carrying capacity of the segment S1 of 100 A, the protection devices F1a, F1b and F1c can for example each be 33 A protection devices.

The advantage of the configuration shown in FIG. 2 is that the segments S1, S2, S3 of the current distribution system 12 can be dimensioned according to demand. This means that the current-carrying capacity of individual segments S1, S2, S3 can be different. For example, the segment S3 can have a lower current-carrying capacity than the segment S1, as fewer loads 16 are connected and thus a lower current must be transmitted through the respective segment S3.

The disadvantage of this type of design is that in many cases it is necessary to oversize the system to ensure that no overload can occur in one of the segments S1, S2, S3.

A further problem with the embodiment shown in FIG. 2 is that connections between the segments S1, S2, S3 are disconnected in the event of an overload. This results in a redistribution of the current flows in the current distribution system 12, which in turn can lead to an overload of further segments S1, S2, S3 and thus trigger a chain reaction.

Furthermore, individual segments S1, S2, S3 may run autonomously after being switched off. Reconnecting to the rest of the current distribution system 12 can prove difficult.

Figure 3:
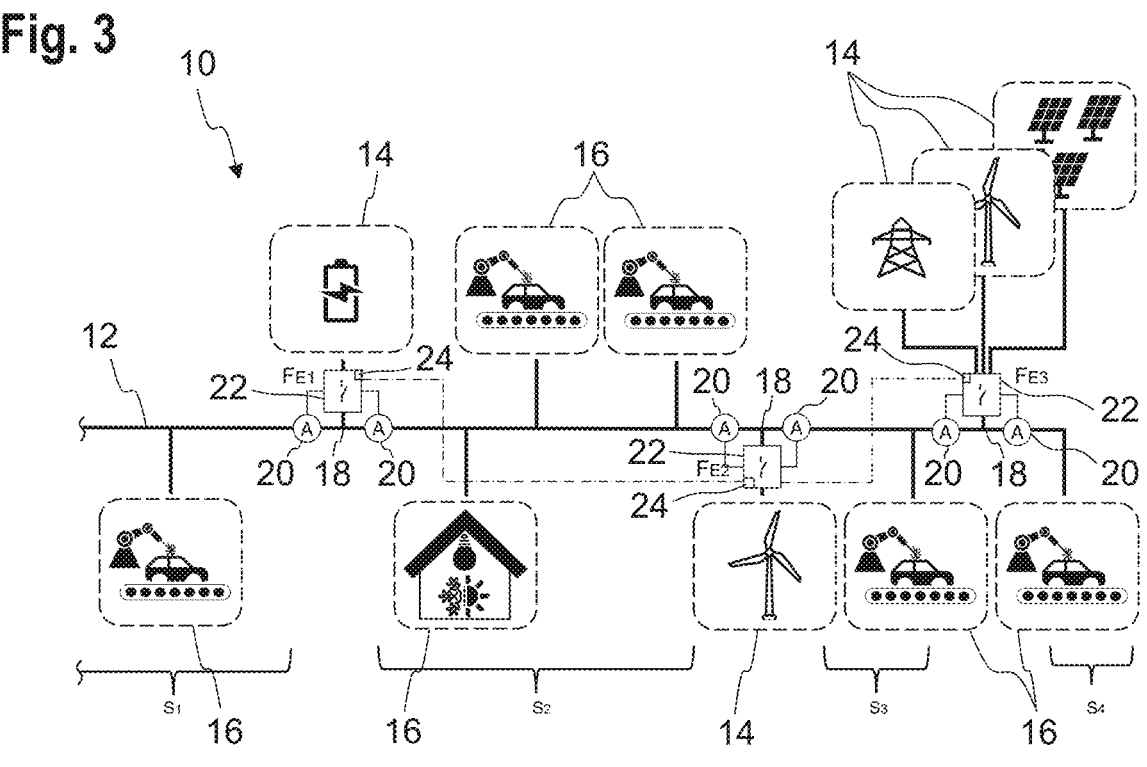
FIG. 3 shows a schematic representation of a second embodiment of an electrical grid according to the present disclosure with current measuring devices for measuring the current flow from the feed-in points into adjacent segments.

FIG. 3 shows a schematic representation of a second embodiment of an electrical grid 10 according to the present disclosure, in which the above-mentioned disadvantages are eliminated.

The second embodiment substantially corresponds to the embodiment described above, so that only the differences will be discussed. Reference is made to the explanations above.

In the second embodiment, it is not the current distribution system 12 which is interrupted to protect against overload, but the connection to the feed-in systems 14, in particular the generators and/or storage systems.

For this purpose, current detection devices 20 are provided at each of the feed-in points 18 of the current distribution system 12, which measure the current flow in two different directions from the feed-in point 18.

As shown in FIG. 3, the current detection devices 20 can in particular be arranged directly in the current distribution system 12, i.e. not in the supply line. This has the advantage that the current flow in the current distribution system 12 can continue to be monitored even if the supply line is disconnected or switched off.

A current regulation device 22 is respectively provided at each of the feed-in points 18 of the current distribution system 12, for example a fuse switch FE1, FE2, FE3. In the example embodiment, the fuse switches FE1, FE2, FE3 form a central component of the electrical grid 10 according to the present disclosure and are each connected to the current detection devices 20 of the respective feed-in point 18.

If the current flow overloads the current distribution system 12 and/or one of the segments S1, S2, S3, S4, this is detected by the current detection devices 20. The design of the segments S1, S2, S3, S4 and the current regulation devices 22 again corresponds to the rules described in the first example embodiment.

In the event that an overload is imminent, one of the current regulation devices 22 can intervene and disconnect one or more of the feed-in systems 14 from the current distribution system 12 or the respective feed-in point 18.

Alternatively or additionally, the current regulation devices 22 may be configured and set up to regulate currents in the current distribution system 12 by regulating a power of a feed-in system 14 connected to a feed-in point 18 (for example by throttling the power of a generator).

In the example embodiment, the power regulation devices 22 each have a communication unit 24 via which they can communicate with each other.

Communication can take place via radio, a data line or via the current distribution system 12 itself, for example by transmitting an analog or digital signal via the respective power lines and/or busbars.

By means of the communication units 24, data acquired by the current detection devices 20 about the current flow in one of the segments S1, S2, S3, S4 on one segment side can be transmitted to a current regulation device 22 on another segment side.

For example, data can be transmitted from the fuse switch FE1 to the fuse switch FE2, both of which are arranged at opposite ends of the segment S2.

In this way, current flows in the current distribution system 12 can be better monitored and the available resources can be better utilized. Accordingly, the necessary oversizing of the current distribution system 12 can be reduced without increasing the risk of an overload.

Figure 4:
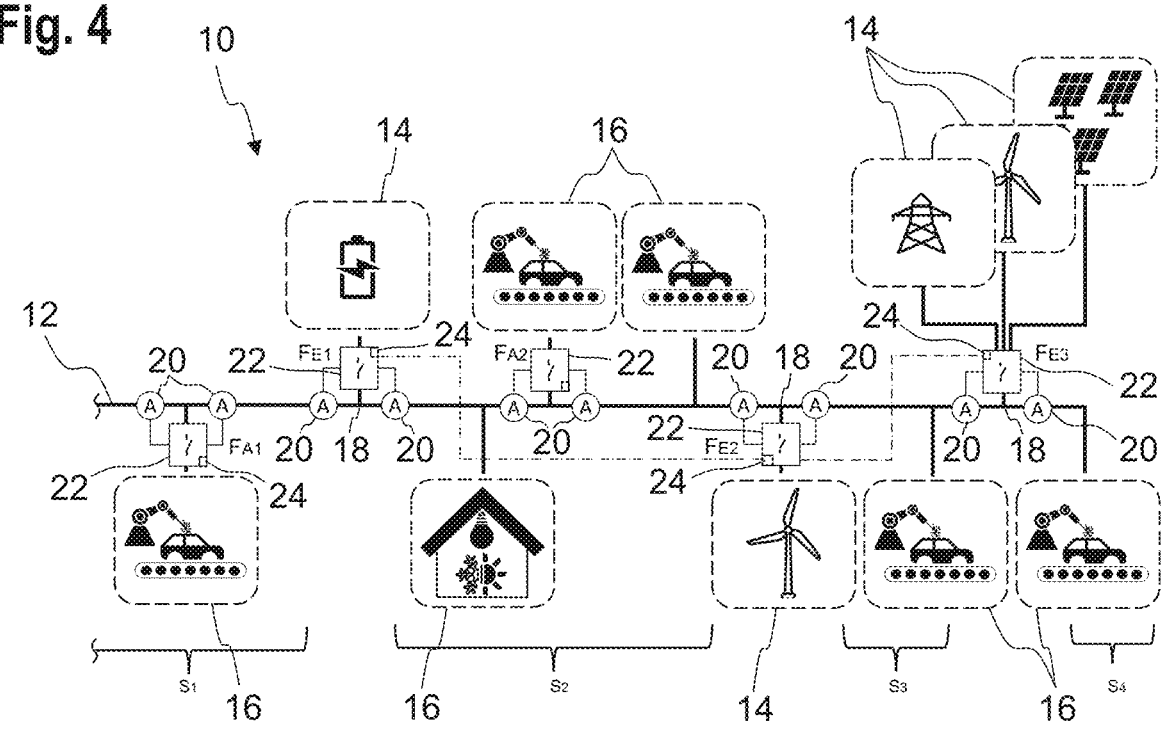
FIG. 4 shows a schematic representation of a third embodiment of an electrical grid according to the present disclosure with current measuring devices for measuring the current flow from the feed-in points into adjacent segments and at individual outgoing lines with main loads.

FIG. 4 shows a schematic representation of a third embodiment of an electrical grid 10 according to the present disclosure.

This substantially corresponds to the second embodiment described above, so that only the differences will be discussed. In this respect, reference is made to the explanations above.

In the third embodiment, additional current regulation devices 22 are provided, which are arranged between the current distribution system 12 and certain loads 16. In other words, certain loads 16 are protected in the outgoing lines in the same way as the feed-in systems 14.

For this purpose, current detection devices 20 are provided at the respective outgoing lines, which measure the current flow in the current distribution system 12 in two different directions towards the outgoing lines.

If the electrical grid 10 and/or one of the segments S1, S2, S3, S4 is overloaded, one or more of the loads 16 can be disconnected from the current distribution system 12 via the respective current regulation device 22. This can be done by a hard switch-off. Alternatively, the overload can be responded to by requesting the system to reduce the energy demand.

For protection against a blackout, it is not necessary to protect all loads 16 in this way. Depending on the application, it may be sufficient to protect some large loads. For example, FIG. 4 shows that several electrical loads 16 are provided, but only some of them are protected by current regulation devices 22.

In particular, the protections described above do not necessarily have to be used for smaller generators or regenerative systems. When designing and setting up the electrical grid 10, it may also be sufficient to integrate these generators or systems while maintaining a reserve.

In the example embodiment, the current regulation devices 22 provided at the respective outgoing lines also have communication units 24, via which they can communicate with the other current regulation devices 22. This further improves the control over the current flows, which enables a leaner design of the current distribution system 12.

In the third example embodiment, the feed-in points 18 in the current distribution system 12 are arranged such that current can respectively flow from each of the feed-in points 18 in different directions into the current distribution system 12. This splits the current flow coming from the respective feed-in system 14, which in turn reduces the load on the individual lines of the current distribution system 12.

As shown in FIG. 4, this arrangement results in that three lines branch off from each of the feed-in points 18. However, it is not necessary to detect the current in all three lines separately to achieve comprehensive control of the current flows. If the current in two of the lines is measured using the current detection devices 20, the current in the third line can be calculated according to Kirchhoff's node rule.

Figure 5:
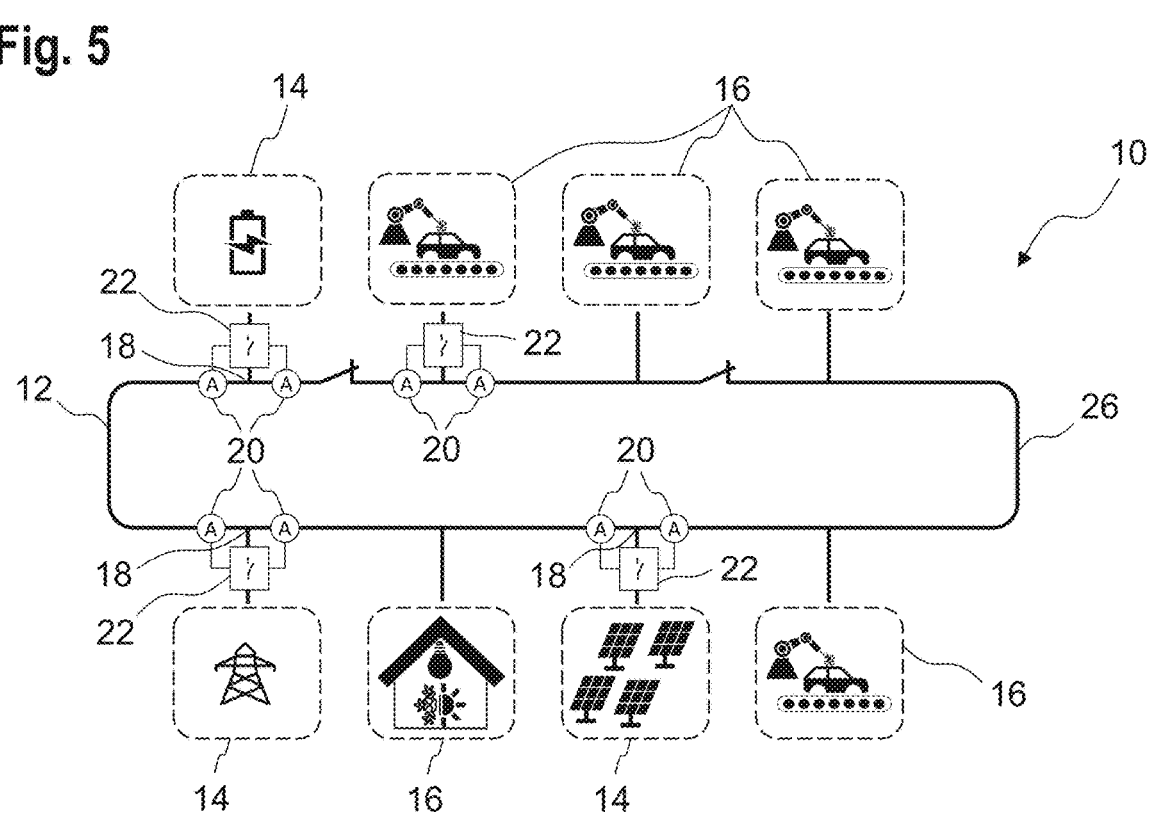
FIG. 5 shows a schematic representation of a fourth embodiment of an electrical grid according to the present disclosure with a ring-shaped current distribution system.

FIG. 5 shows a schematic representation of a fourth embodiment of an electrical grid 10 according to the present disclosure.

It also substantially corresponds to the embodiments described above, so that only the differences will be discussed. In this respect, reference is made to the explanations above.

In the embodiment shown in FIG. 5, the current distribution system 12 is designed as a ring structure 26.

A significant advantage of such a ring structure 26 is that it can be divided into several segments (not shown). During maintenance, an individual segment can then be relatively easily disconnected from the other segments and de-energized. The other segments remain connected to each other so that they are not affected by the disconnection.

Preferably, the ring structure 26 is designed such that the current flow at a feed-in point 18 is at least approximately evenly distributed in both directions of the ring structure 26.

In the case of several feed-in systems 14, it can in particular be provided that these are distributed evenly over the ring structure 26. In this way, the current distribution system 12 is optimally utilized and the necessary oversizing is reduced to a minimum.

The ring structure 26 is also provided with current detection devices 20 at each of the feed-in points 18, which measure the current flow in two different directions from the feed-in point 18.

In addition, one current regulation device 22 is respectively provided at each of the feed-in points 18, which is connected to the respective current detection devices 20 of the respective feed-in point 18.

As described in the preceding example embodiments, if there is a risk that the current flow will overload the power distribution system 12, regulation and/or disconnection of individual feed-in systems 14 can take place.

Also in this example embodiment, the current distribution system 12 and the current regulation devices 22 are designed such that a sum of the breaking currents of the current regulation devices 22 is less than the current carrying capacity of the current distribution system 12 or of a segment.

This ensures that no overload can occur.

In principle, it is therefore ensured that energy distribution in a microgrid is guaranteed without overloading the current distribution system 12. Any otherwise necessary oversizing can be prevented or at least reduced to a minimum. In other words, the power of the current distribution system 12 can be optimally utilized while at the same time ensuring safe operation of the system FIG. 6 shows a schematic representation of a fifth embodiment of an electrical grid 10 according to the present disclosure.

This also substantially corresponds to the embodiments described above, so that only the differences will be discussed. In this respect, reference is made to the explanations above.

Figure 6:
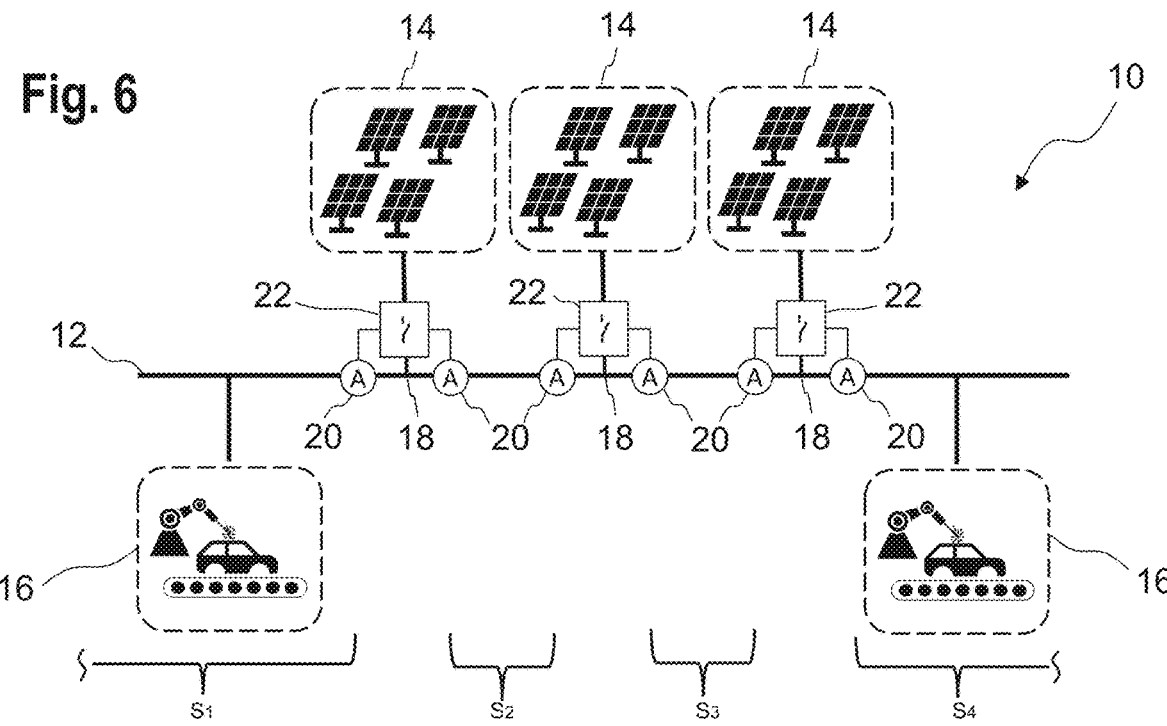
FIG. 6 shows a schematic representation of a fifth embodiment of an electrical grid according to the present disclosure with several feed-in systems arranged in a row.

In FIG. 6, the feed-in points 18 form the boundaries of the segments S1, S2, S3, S4. Each segment S1, S2, S3, S4 is fed from at least one side.

The current flow into or out of the segments S1, S2, S3, S4 is monitored by means of current detection devices 20, which are arranged at the respective segment ends.

A special feature of the embodiment is that a plurality of feed-in systems 14 are arranged next to each other. Thus, in this example, there are segments 2, 3 which have a feed-in point 18 or feed-in system 14 but no load 16 assigned thereto.

| List of reference numerals | |
| --- | --- |
| Reference numeral | Designation |
| 9 | Conventional electrical grid |
| 10 | Electrical grid |
| 12 | Current distribution system |
| 14 | Feed-in system |
| 16 | Load |
| 18 | Feed-in point |
| 20 | Current detection device |
| 22 | Current regulation device |
| 24 | Communication unit |
| 26 | Ring structure |
| S1 | First segment |
| S2 | Second segment |
| S3 | Third segment |

The invention claimed is:

1. An electrical grid for a decentralized energy system, comprising:
   at least one current distribution system having at least two feed-in points,
   wherein three lines branch off from each of the at least two feed-in points, wherein a current regulation device is located in a first line of the three lines, and wherein a current detection device is located in each of a second line and a third line of the three lines,
   wherein the current detection devices are configured and set up to detect respective currents flowing in different directions into the current distribution system at each of the at least two feed-in points by measuring the current in the second line and the third line branching off from each of the feed-in points, and
   wherein the respective current regulation device located in the first line is configured and set up to regulate currents in the current distribution system if at least one of the currents detected by the current detection device exceeds a predetermined threshold value.

2. The electrical grid according to claim 1, wherein the current detection device is configured and set up to detect current flows electronically and/or based on a heating of a component of the current distribution system and/or based on a current-induced magnetic field.

3. The electrical grid according to claim 1, wherein the current detection device is configured and set up to detect current flows based on a heating of a component of the current distribution system, and wherein the component of the current distribution system is at least one of a safety wire or a bimetallic strip.

4. The electrical grid according to claim 1, wherein the current regulation device is configured and set up to regulate currents in the current distribution system by regulating a power of a feed-in system connected to one of the at least two feed-in points of the current distribution system, switching off the feed-in system and/or disconnecting the feed-in system from the feed-in point.

5. The electrical grid according to claim 1, wherein the current regulation device is configured and set up to regulate currents in the current distribution system by interrupting the current distribution system in at least one direction and/or by regulating, switching off or disconnecting loads connected to the current distribution system from the current distribution system.

6. The electrical grid according to claim 1, wherein the current distribution system is configured and set up to be operated with direct current.

7. The electrical grid according to claim 1, each of the current detection devices and/or the current regulations devices having a communication unit via which the current detection devices and/or the current regulation devices communicate with each other.

8. The electrical grid according to claim 1, wherein the current distribution system comprises a plurality of segments, which are separably connected to each other and/or separably connected to feed-in systems by current regulation devices.

9. The electrical grid according to claim 8, wherein a connection of two segments takes place at one of the at least two feed-in points of the current distribution system via which both segments are supplied with current.

10. The electrical grid according to claim 8, wherein each segment is connected to at least one of the feed-in systems and/or wherein each segment has at least one of the at least two feed-in points of the current distribution system assigned thereto.

11. The electrical grid according to claim 1, wherein the at least two feed-in points of the current distribution system are each protected via an associated current regulation device.

12. The electrical grid according to claim 1, wherein two or more feed-in systems are connected to at least one of at least two the feed-in points of the current distribution system.

13. The electrical grid according to claim 1, wherein the at least two feed-in points in the current distribution system are each arranged such that current can respectively flow from the feed-in points in different directions into the current distribution system.

14. The electrical grid according to claim 1, wherein the current distribution system is configured as a ring structure.

15. An electrical grid for a decentralized energy system, comprising:

at least one current distribution system having at least two feed-in points, wherein each of the at least two feed-in points is connected with a feed-in system via a first line in which a current regulation device is located, wherein a second line as well as a third line branch off from each of the at least two feed-in points, wherein a current detection device is located in the second line, and wherein another current detection device is located in the third line, wherein the current detection devices are configured and set up to detect respective currents flowing in different directions into the current distribution system at each of the at least two feed-in points, and wherein each of the current regulation devices is configured and set up to regulate currents in the current distribution system by at least one of regulating a power of the respective feed-in system, switching off the respective feed-in system or disconnecting the respective feed-in system from the feed-in point.

* * * * *